(12) United States Patent
Kumar et al.

(10) Patent No.: US 8,982,958 B2
(45) Date of Patent: Mar. 17, 2015

(54) VIDEO REPRESENTATION USING A SPARSITY-BASED MODEL

(75) Inventors: Mrityunjay Kumar, Rochester, NY (US); Abdolreza Abdolhosseini Moghadam, Okemos, MI (US); Alexander C. Loui, Penfield, NY (US); Jiebo Luo, Pittsford, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 367 days.

(21) Appl. No.: 13/413,962

(22) Filed: Mar. 7, 2012

(65) Prior Publication Data

US 2013/0235939 A1 Sep. 12, 2013

(51) Int. Cl.
H04N 7/50 (2006.01)
H04N 19/537 (2014.01)
H04N 19/90 (2014.01)
H04N 19/59 (2014.01)

(52) U.S. Cl.
CPC ............ H04N 19/90 (2013.01); H04N 19/537 (2013.01); *H04N 19/59* (2013.01)
USPC ............ 375/240.18; 375/240.16; 375/240.14; 375/240.02; 382/173; 382/107; 382/162; 348/441; 348/700; 348/135

(58) Field of Classification Search
CPC ............ H04N 7/014; H04N 19/0029; H04N 19/00624; H04N 19/00745; H04N 7/0127; H04N 7/0137; H04N 19/00127; H04N 19/00163; H04N 19/00472; H04N 19/00721; H04N 19/00751
See application file for complete search history.

(56) References Cited

U.S. PATENT DOCUMENTS

| 7,149,361 | B2 * | 12/2006 | Peele et al. | 382/236 |
| 8,457,469 | B2 * | 6/2013 | Suzuki | 386/239 |
| 2005/0219264 | A1 * | 10/2005 | Shum et al. | 345/629 |
| 2006/0056711 | A1 * | 3/2006 | Lee et al. | 382/232 |
| 2011/0025870 | A1 * | 2/2011 | Baraniuk et al. | 348/222.1 |

OTHER PUBLICATIONS

Cheung et al., "Video epitomes," Proc. IEEE Conference on Computer Vision and Pattern Recognition, vol. 1, pp. 42-49 (2005).
Petrovic et al., "Recursive estimation of generative models of video" Proc. IEEE Conference on Computer Vision and Pattern Recognition, vol. 1, pp. 79-86, 2006).
Peng et al., "RASL: Robust alignment by sparse and low-rank decomposition for linearly correlated images," Proc. IEEE Conference on Computer Vision and Pattern Recognition, pp. 763-770 (2010).

(Continued)

*Primary Examiner* — Gims Philippe
*Assistant Examiner* — Samuel D Fereja

(57) ABSTRACT

A method for representing a video sequence including a time sequence of input video frames, the input video frames including some common scene content that is common to all of the input video frames and some dynamic scene content that changes between at least some of the input video frames. Affine transform are determined to align the common scene content in the input video frames. A common video frame including the common scene content is determined by forming a sparse combination of a first basis functions. A dynamic video frame is determined for each input video frame by forming a sparse combination of a second basis functions, wherein the dynamic video frames can be combined with the respective affine transforms and the common video frame to provide reconstructed video frames.

20 Claims, 13 Drawing Sheets

(56) References Cited

OTHER PUBLICATIONS

Baron et al., "Distributed compressive sensing," preprint (2005).
Sankaranarayanan et al., "Compressive acquisition of dynamic scenes," Proc.11$^{th}$ European Conference on Computer Vision, pp. 129-142 (2010).
Nagesh et al., "A compressive sensing approach for expression-invariant face recognition," Proc. IEEE Conference on Computer Vision and Pattern Recognition, pp. 1518-1525 (2009).
Brown, "A survey of image registration techniques," ACM Computing Surveys, vol. 24, issue 4, pp. 325-376 (1992).
Bruckstein et al., "From sparse solutions of systems of equations to sparse modeling of signals and images," SIAM Review, pp. 34-81, (2009).
Aharon et al., "K-SVD: An algorithm for designing overcomplete dictionaries for sparse representation," IEEE Transactions on Signal Processing, vol. 54, pp. 4311-4322 (2006).

\* cited by examiner

VIDEO REPRESENTATION USING A SPARSITY-BASED MODEL

CROSS-REFERENCE TO RELATED APPLICATIONS

Reference is made to commonly assigned, co-pending U.S. patent application Ser. No. 13/413,892, entitled: "Scene boundary determination using sparsity-based model", by Kumar et al., which is incorporated herein by reference.

FIELD OF THE INVENTION

This invention relates generally to the field of video understanding, and more particularly to a method to represent the static and the dynamic content of the video using a sparse representation.

BACKGROUND OF THE INVENTION

With the development of digital imaging and storage technologies, video clips can be conveniently captured by consumers using various devices such as camcorders, digital cameras or cell phones and stored for later viewing and processing. Efficient content-aware video representation models are critical for many video analysis and processing applications including denoising, restoration, and semantic analysis.

Developing models to capture spatiotemporal information present in video data is an active research area and several approaches to represent video data content effectively have been proposed. For example, Cheung et al. in the article "Video epitomes" (Proc. IEEE Conference on Computer Vision and Pattern Recognition, Vol. 1, pp. 42-49, 2005), teach using patch-based probability models to represent video content. However, their model does not capture spatial correlation.

In the article "Recursive estimation of generative models of video" (Proc. IEEE Conference on Computer Vision and Pattern Recognition, Vol. 1, pp. 79-86, 2006), Petrovic et al. teach a generative model and learning procedure for unsupervised video clustering into scenes. However, they assume videos to have only one scene. Furthermore, their framework does not model local motion.

Peng et al., in the article "RASL: Robust alignment by sparse and low-rank decomposition for linearly correlated images" (Proc. IEEE Conference on Computer Vision and Pattern Recognition, pp. 763-770, 2010), teach a sparsity-based method for simultaneously aligning a batch of linearly correlated images. Clearly, this model is not suitable for video processing as video frames, in general, are not linearly correlated.

Another method taught by Baron et al., in the article "Distributed compressive sensing" (preprint, 2005), models both intra- and inter-signal correlation structures for distributed coding algorithms.

In the article "Compressive acquisition of dynamic scenes" (Proc. 11th European Conference on Computer Vision, pp. 129-142, 2010), Sankaranarayanan et al. teach a compressed sensing-based model for capturing video data at much lower rate than the Nyquist frequency. However, this model works only for single scene video.

In the article "A compressive sensing approach for expression-invariant face recognition" (Proc. IEEE Conference on Computer Vision and Pattern Recognition, pp. 1518-1525, 2009), Nagesh et al. teaches a face recognition algorithm based on the theory of compressed sensing. Given a set of registered training face images from one person, their algorithm estimates a common image and a series of innovation images. The innovation images are further exploited for face recognition. However, this algorithm is not suitable for video modeling as it was designed explicitly for face recognition and does not preserve pixel-level information.

There remains a need for a video representation framework that is data adaptive, robust to noise and different content, and can be applied to wide varieties of videos including reconstruction, denoising, and semantic understanding.

SUMMARY OF THE INVENTION

The present invention represents a method for representing a video sequence including a time sequence of input video frames, the input video frames including some common scene content that is common to all of the input video frames and some dynamic scene content that changes between at least some of the input video frames, comprising:

a) determining an affine transform having a set of affine transform coefficients for each input video frame that can be used to align the common scene content in the input video frames;

b) defining a first set of basis functions for representing the common scene content;

c) defining a second set of basis functions for representing the dynamic scene content;

d) automatically determining a common video frame including the common scene content by forming a sparse combination of the first basis functions;

e) automatically determining a dynamic video frame for each input video frame by forming a sparse combination of the second basis functions, wherein the dynamic video frames can be combined with the respective affine transforms and the common video frame to provide reconstructed video frames providing representations of the respective input video frames; and f) storing representations of the common video frame and the dynamic video frames in a processor-accessible memory;

wherein the method is performed at least in part using a data processing system.

The present invention has the advantage that it can detect local motion present in the scene without performing any motion estimation.

It has the additional advantage that it can be used for complex video processing tasks such as reconstruction, denoising, and semantic understanding.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
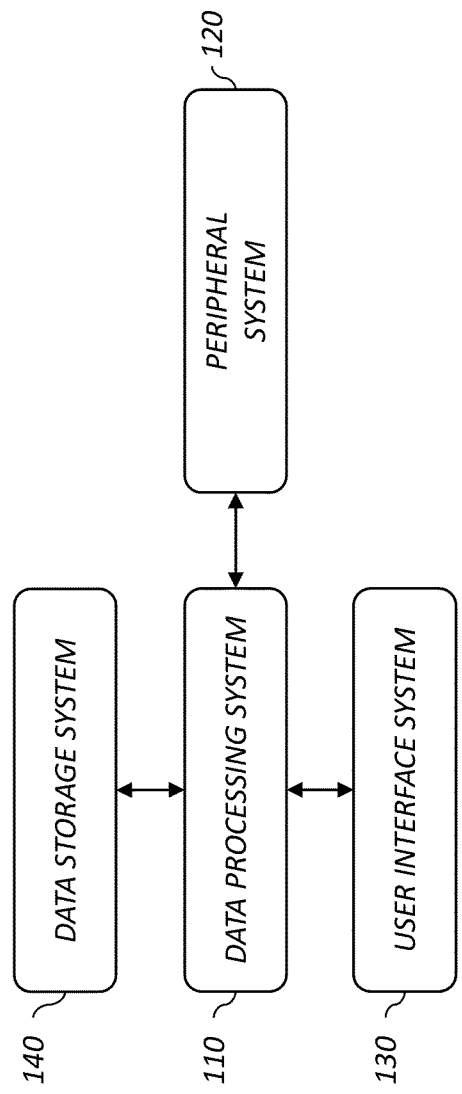
FIG. 1 is a high-level diagram showing the components of a system for summarizing digital video according to an embodiment of the present invention.

FIG. 1 is a high-level diagram showing the components of a system for processing a digital video sequence according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes of FIGS. 2-11 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-11 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
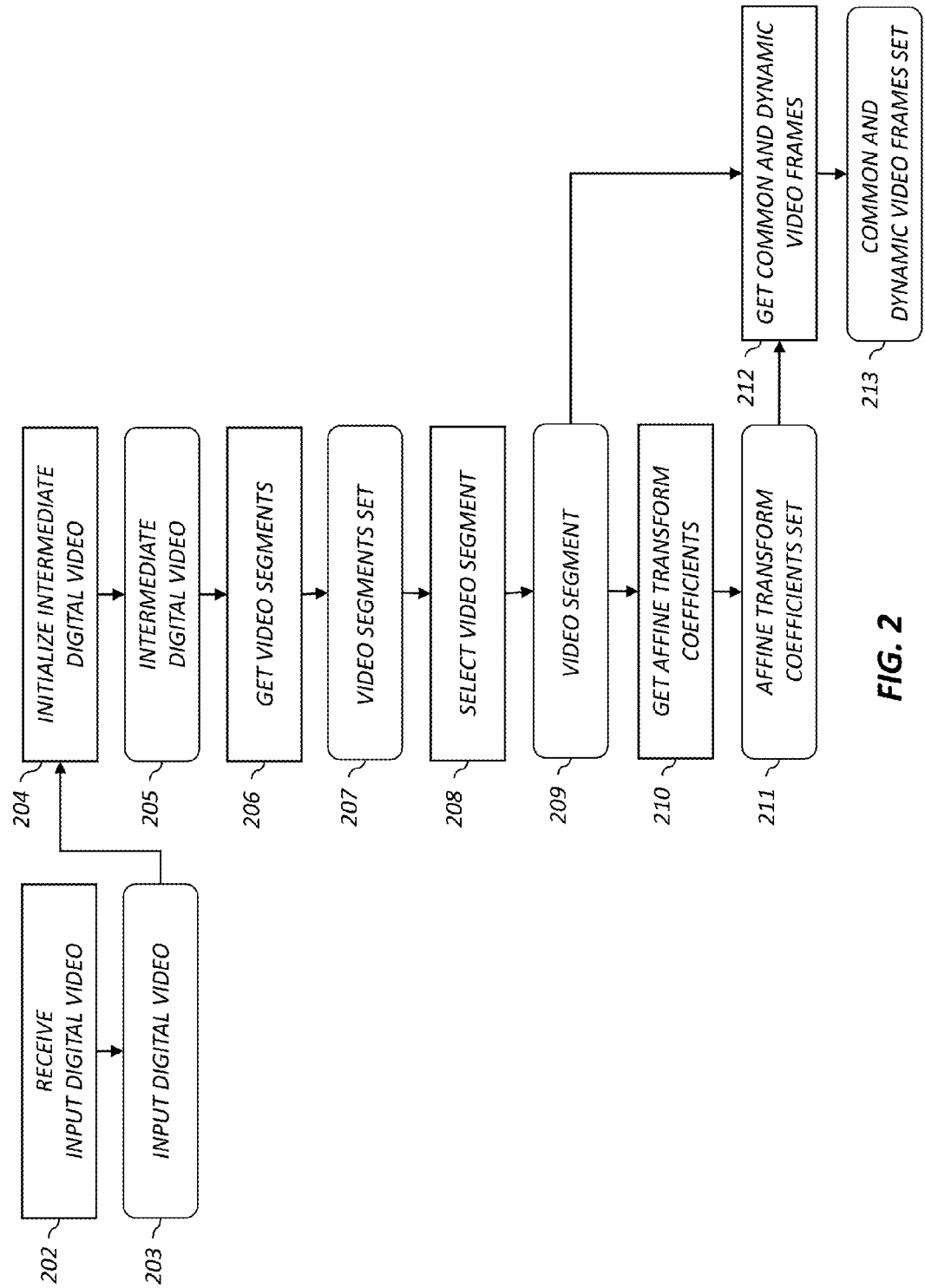
FIG. 2 is a flow diagram illustrating a method for determining common and dynamic scene contents from a video sequence according to an embodiment of the present invention.

FIG. 2 is a flow diagram illustrating a method for representing common and dynamic scene content of a video according to an embodiment of the present invention. An input digital video 203 representing a video sequence captured of a scene is received in a receive input digital video step 202. The video sequence includes a time sequence of video frames. Each video frame includes an array of pixels having associated pixel values. The input digital video 203 can be captured using any type of video capture device known in the art such as a video camera, a digital still camera with a video capture mode or a camera phone, and can be received in any digital video format known in the art.

An initialize intermediate digital video step 204 is used to initialize an intermediate digital video 205. The intermediate digital video 205 is a modified video estimated from the input digital video 203.

A get video segments step 206 detects the scene boundaries (i.e., the scene change locations) in the intermediate digital video 205. The intermediate digital video 205 is divided at the scene change locations to provide a set of video segments, which are collected in a video segments set 207.

A select video segment step 208 selects a particular video segment from the video segments set 207 to provide a selected video segment 209.

A get affine transform coefficients step 210 determines an affine transform having a set of affine transform coefficients for each input video frame of the selected video segment 209. The sets of affine transform coefficients for each video frame are collected in an affine transform coefficients set 211. The affine transform coefficients of the video frames corresponding to the selected video segment 209 are used to align the common scene content present in the selected video segment 209.

Finally, a get common and dynamic video frames step 212 uses the selected video segment 209 and the affine transform coefficients set 211 to determine a common frame and a set of dynamic frames. The common video frame represents the common scene content that is common to all of the video frames of the selected video segment 209. The set of dynamic video frames represent the scene content that changes between at least some of the video frames of the selected video segment 209. The common video frame and dynamic video frames are collected in a common and dynamic video frames set 213.

The individual steps outlined in FIG. 2 will now be described in greater detail. The initialize intermediate digital video step 204 is a preprocessing step that preprocesses the input digital video 203 to produce the intermediate digital video 205. The intermediate digital video 205 is more suitable for the subsequent steps carried out to produce the common and dynamic video frames set 213. For example, in some embodiments the input digital video 203 is down-sampled to a lower spatial resolution to provide the intermediate digital video 205. Similarly, the input digital video 203 can be down-sampled temporally such that the intermediate digital video 205 has fewer video frames that need to be analyzed. In other embodiments, the initialize intermediate digital video step 204 can apply other types of operations such as tone scale and color adjustments, noise reduction or sharpening operations.

The get video segments step 206 analyzes the intermediate digital video 205 to provide the video segments set 207. The video segments set 207 represents the scene boundary locations in the intermediate digital video 205. Mathematical algorithms for determining scene boundary locations are well-known in the art. Any such method can be used in accordance with the present invention. In a preferred embodiment, the get video segments step 206 uses the method for determining scene boundary locations that will be described below with respect to FIGS. 10 and 11.

The select video segment step 208 selects a video segment from the video segments set 207 to provide the selected video segment 209. The selected video segment 209 can be selected in any appropriate way known to those skilled in the art. In a preferred embodiment, a user interface is provided enabling a user to manually select the video segment to be designated as the selected video segment 209. In other embodiments, the video segments set 207 can be automatically analyzed to designate the selected video segment 209 according to a predefined criterion. For example, the video segment depicting the maximum amount of local motion can be designated as the selected video segment 209.

The get affine transform coefficients step 210 determines an affine transform defined by a set of affine transform coefficients for each video frame of the selected video segment 209. Let $T(\Theta_i)$ be the affine transform having the set of affine transform coefficients $\Theta_i$ corresponding to the $i^{th}$ video frame of the selected video segment 209, where $1 \leq i \leq n$. The affine transform coefficients $\Theta_i$ include parameters for displacement along x- and y-axis, rotation and scaling for the $i^{th}$ video frame of the selected video segment 209. In a preferred embodiment of the present invention, $\Theta_i$ contains only the displacements along the x- and y-axis (i.e., $\Theta_i = \{x_i, y_i\}$, where $x_i$ and $y_i$ are global displacements along x- and y-axis, respectively) for the $i^{th}$ video frame of the selected video segment 209. The affine transform $T(\Theta_i)$ is a spatial transform that can be applied to a given input image $z(p, q)$ to provide a transformed image $z(p', q')$. Functionally this can be expressed as $T(\Theta_i)z(p, q) = z(p', q')$, where $$\begin{bmatrix} p' \\ q' \end{bmatrix} = \begin{bmatrix} p \\ q \end{bmatrix} + \begin{bmatrix} x_i \\ y_i \end{bmatrix} \quad (1)$$

The affine transform coefficients $\Theta_i$ ($1 \leq i \leq n$) are collected in the affine transform coefficients set 211. The estimation of $\Theta_i$ is explained next.

Figure 3:
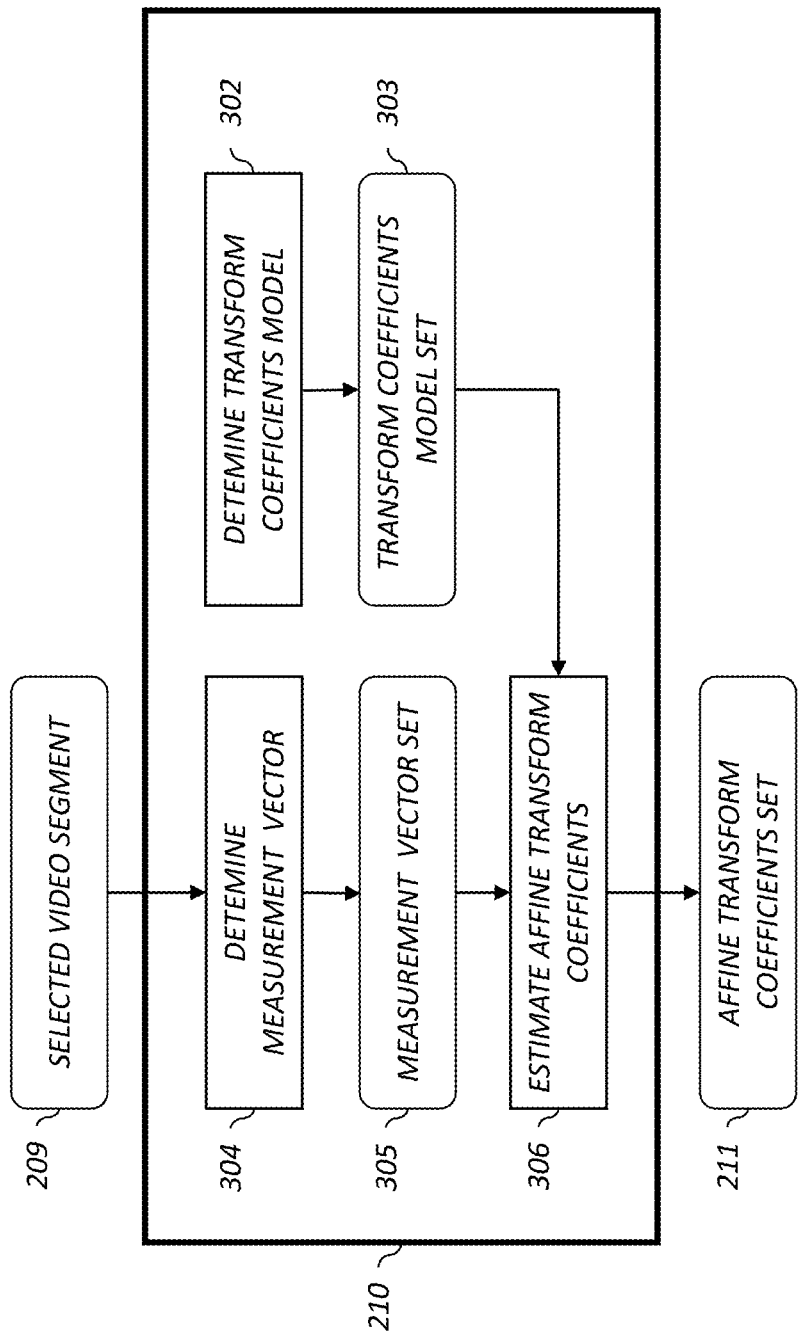
FIG. 3 is a block diagram showing a detailed view of the get affine transform coefficients step of FIG. 2.

FIG. 3 is a more detailed view of the get affine transform coefficients step 210 according to a preferred embodiment. In a determine transform coefficients model step 302, a transform model to represent transform coefficient in affine transform coefficients set 211 is determined. The transform model to relate the transform coefficients of video frames can be determined in any appropriate way known to those skilled in the art. In a preferred embodiment of the present invention, the transform coefficients model set 303 is represented using an auto regressive model as given by Eqs. (2) and (3) below:

$$x_i = x_{i-1} + \Delta x_{i-1} \quad (2)$$

and $$y_i = y_{i-1} + \Delta y_{i-1} \quad (3)$$

where $1 \leq i \leq n$. Furthermore, it is assumed that $\Delta x_0 = \Delta y_0 = 0$.

In a determine measurement vector step 304, a set of measurement vectors is determined responsive to the selected video segment 209. The determined measurement vectors are collected in a measurement vector set 305. In the preferred embodiment, the determine measurement vector step 304 computes the global displacements in x- and y-directions between successive video frames of the selected video segment 209. Mathematical algorithms for determining global displacements between pair of images are well-known in the art. An in-depth analysis of image alignment, its mathematical structure and relevancy can be found in the article by Brown entitled "A survey of image registration techniques" (ACM Computing Surveys, Vol. 24, issue 4, pp. 325-376, 1992), which is incorporated herein by reference.

An estimate affine transform coefficients step 306 uses the measurement vector set 305 and transform coefficients model set 303 to determine the affine transform coefficients set 211. The affine transform coefficients set 211 can be determined in any appropriate way known to those skilled in the art. In a preferred embodiment, the affine transform coefficients set 211 is determined using a sparse representation framework where the measurement vector set 305 and the auto regressive model of the transform coefficients model set 303 are related using a sparse linear relationship. The affine transform coefficients set 211 is then determined responsive to the sparse linear relationship as explained next.

Let $f_1, f_2, \ldots, f_n$ be the video frames of the selected video segment 209. Furthermore, let $X=[X_1, X_2, \ldots, X_{n-1}]^T$, and $Y=[Y_1, Y_2, \ldots, Y_{n-1}]^T$ be the elements of the measurement vector set 305 corresponding to the selected video segment 209 representing global displacements along x- and y-axis, respectively. The $i^{th}$ ($1 \le i \le n-1$) element of X represents the global displacement between video frames $f_i$ and $f_{i+1}$ in x-direction. Similarly, $i^{th}$ element of Y represents the global displacement between video frames $f_i$ and $f_{i+1}$ in y-direction. In equation form, the sparse linear relationship between X and the auto regressive model stored in the video segments set 207 (Eqs. (2) and (3)) can be expressed using Eq. (4):

$$\begin{bmatrix} X_1 \\ X_2 \\ \vdots \\ X_{n-1} \end{bmatrix} = \begin{bmatrix} 1 & 1 & 0 & 0 & \ldots & 0 \\ 1 & 1 & 1 & 0 & \ldots & 0 \\ \vdots & \vdots & \vdots & & \ldots & \vdots \\ 1 & 1 & 1 & 1 & \ldots & 1 \end{bmatrix} \begin{bmatrix} x_1 \\ \Delta x_1 \\ \vdots \\ \Delta x_{n-1} \end{bmatrix} \quad (4)$$

where $[X_1, X_2, \ldots, X_{n-1}]^T$ are known and $[x_1, \Delta x_1, \ldots \Delta x_{n-1}]^T$ are unknowns. Clearly, there are more unknowns than the number of equations. Furthermore, video frames corresponding to the same scene are expected to display smooth transitions. Therefore, vector $[x_1, \Delta x_1, \ldots \Delta x_{n-1}]^T$ is expected to be sparse (i.e., very few elements of this vector should be non-zero). Therefore, in the preferred embodiment of the present invention, $[x_1, \Delta x_1, \ldots \Delta x_{n-1}]^T$ is estimated by applying sparse solver on Eq. (4). Mathematical algorithms for determining sparse combinations are well-known in the art. An in-depth analysis of sparse combinations, their mathematical structure and relevancy can be found in the article entitled "From sparse solutions of systems of equations to sparse modeling of signals and images," (SIAM Review, pp. 34-81, 2009) by Bruckstein et al., which is incorporated herein by reference.

Similarly, $[y_1, \Delta y_1, \ldots \Delta y_{n-1}]^T$ is estimated by solving the linear equation given by Eq. (5) using a sparse solver:

$$\begin{bmatrix} Y_1 \\ Y_2 \\ \vdots \\ Y_{n-1} \end{bmatrix} = \begin{bmatrix} 1 & 1 & 0 & 0 & \ldots & 0 \\ 1 & 1 & 1 & 0 & \ldots & 0 \\ \vdots & \vdots & & & \ldots & \\ 1 & 1 & 1 & 1 & \ldots & 1 \end{bmatrix} \begin{bmatrix} y_1 \\ \Delta y_1 \\ \vdots \\ \Delta y_{n-1} \end{bmatrix} \quad (5)$$

Note that, from Eqs. (2), and (3), it is clear that knowledge of $[x_1, \Delta x_1, \ldots \Delta x_{n-1}]^T$, and $[y_1, \Delta y_1, \ldots \Delta y_{n-1}]^T$ is sufficient to determine $x_i$, and $y_i$, respectively, $\forall i, 1 \le i \le n$. The affine transform coefficients set 211 is determined by collecting vectors $[x_1, \Delta x_1, \ldots \Delta x_{n-1}]^T$, and $[y_1, \Delta y_1, \ldots \Delta y_{n-1}]^T$.

Figure 4:
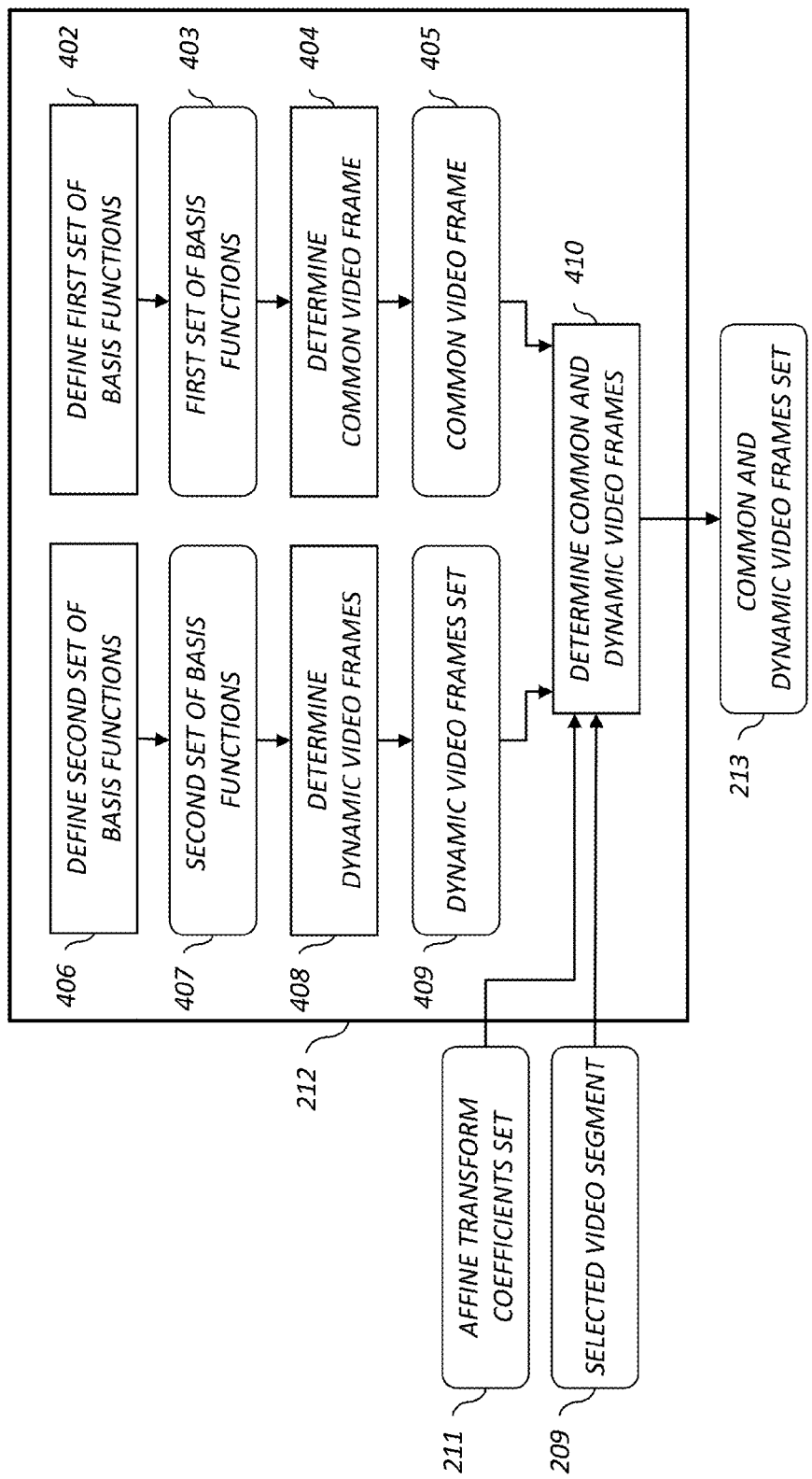
FIG. 4 is a block diagram showing a detailed view of the get common and dynamic video frames step of FIG. 2.

FIG. 4 is a more detailed view of the get common and dynamic video frames step 212 according to a preferred embodiment. In a define first set of basis functions step 402, a set of basis functions that can be used to estimate a common scene content for the selected video segment 209 is defined. The set of basis functions produced by the define first set of basis functions step 402 is collected as first set of basis functions 403. In a preferred embodiment the first set of basis functions 403 are a set of DCT basis functions. DCT basis functions are well-known in the art. For example, the article "K-SVD: An algorithm for designing overcomplete dictionaries for sparse representation" by Aharon et al. (IEEE Transactions on Signal Processing, Vol. 54, pp. 4311-4322, 2006) defines a set of DCT basis functions that can be used in accordance with the present invention. In other embodiments, other sets of basis functions can alternatively be used, such as a set of wavelet basis functions, a set of delta function basis functions or a set of basis functions determined by analyzing a set of training images.

A determine common video frame step 404 determines a common video frame 405 in response to the first set of basis functions 403 as given by Eq. (6) below:

$$C = \psi \beta \quad (6)$$

where C is a vector representation of the common video frame 405 and $\psi$ is a matrix representation of the first set of basis functions 403. $\beta$ is a sparse vector of weighting coefficients where only a minority of the elements of $\beta$ are non-zero. The matrix $\psi$ can be determined in any appropriate way known to those skilled in the art. In a preferred embodiment, $\psi$ is a discrete cosine transform (DCT) matrix.

In a define second set of basis functions step 406, a set of basis functions that can be used to estimate a set of dynamic scenes for the selected video segment 209 is defined. The set of basis functions produced by the define second set of basis functions step 406 is collected as second set of basis functions 407. In a preferred embodiment, the second set of basis functions 407 is the same set of DCT basis functions that were used for the first set of basis functions 403. However, in other embodiments a different set of basis functions can be used.

A determine dynamic video frames step 408 determines a dynamic video frames set 409 responsive to the second set of basis functions 407. The dynamic video frames set 409 can be determined in any appropriate way known to those skilled in the art. In a preferred embodiment, a set of sparse linear combinations of the basis functions of the second set of basis functions 407 is determined to represent the dynamic video frames set 409 as given by Eq. (7) below:

$$D_i = \phi \alpha_i; \ 1 \le i \le n \quad (7)$$

where $D_i$ is the vector representation of the dynamic scene corresponding to $f_i$ and $\phi$ is the matrix representation of the second set of basis functions 407, and $\alpha_i$ ($1 \le i \le n$) are sparse vectors of weighting coefficients. In a preferred embodiment, $\phi$ is assumed to be same as $\psi$ (i.e., $\phi = \psi$).

A determine common and dynamic video frames step 410 produces the common and dynamic video frames set 213 responsive to the affine transform coefficients set 211, the selected video segment 209, the common video frame 405, and the dynamic video frames set 409. The common and dynamic video frames set 213 can be determined in any appropriate way known to those skilled in the art. In a preferred embodiment, the determine common and dynamic video frames step 410 solves Eq. (8) to determine the common and dynamic video frames set 213.

$$\begin{bmatrix} f_1 \\ f_2 \\ f_3 \\ \vdots \\ f_n \end{bmatrix} = \begin{bmatrix} T(\Theta_1)\psi & \psi & 0 & \ldots & 0 \\ T(\Theta_2)\psi & 0 & \psi & \ldots & 0 \\ \vdots & & & & \\ T(\Theta_n)\psi & 0 & 0 & \ldots & \psi \end{bmatrix} \begin{bmatrix} \beta \\ \alpha_1 \\ \alpha_2 \\ \vdots \\ \alpha_n \end{bmatrix} \quad (8)$$

From Eq. (8), it is clear that $f_i = T(\Theta_i)C + D_i$, where $\Theta_i = \{x_i, y_i\}$, $C = \psi\beta$, and $D_i = \phi\alpha_i = \psi\alpha_i$. Due to the sparse nature of $\beta$ and $\alpha_i$, vector $[\beta, \alpha_1, \ldots, \alpha_n]^T$ is estimated using a sparse solver.

Mathematical algorithms to solve the linear equation of the form shown in Eq. (9) for determining sparse vector are well-known in the art. An in-depth analysis of sparse solvers, their mathematical structures and relevancies can be found in the aforementioned article by Bruckstein et al. entitled "From Sparse Solutions of Systems of Equations to Sparse Modeling of Signals and Images." The common and dynamic video frames set 213 is determined by collecting the common video frame C and the dynamic video frames $D_i$ (1≤i≤n), where C=ψβ, and $D_i$=ψ$α_i$.

Figure 5:
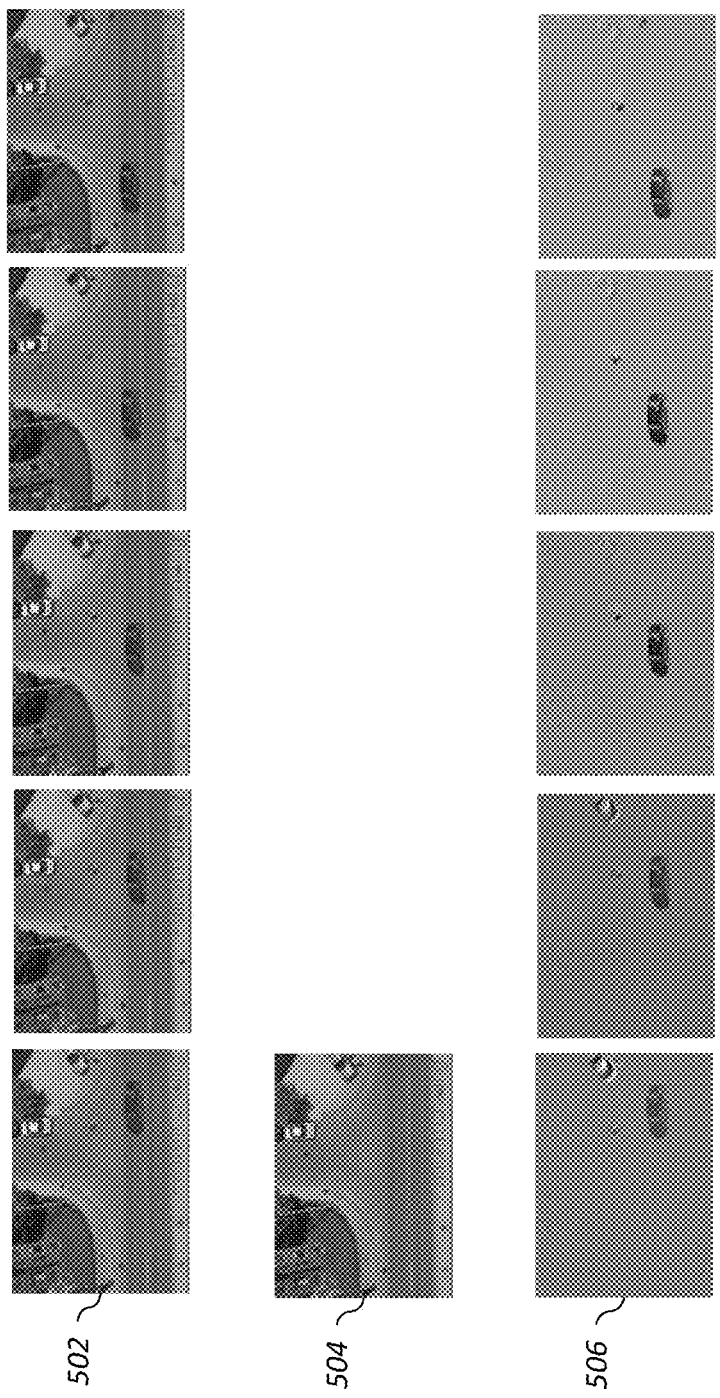
FIG. 5 shows example common and dynamic scene content results obtained according to an embodiment of the present invention.

FIG. 5 shows an example of a video segment 502 including five video frames. A common video frame 504 and dynamic video frames 506 corresponding to the video segment 502 determined using the method shown in FIG. 2 are also shown. It can be seen that the common scene content in the video segment 502 is captured by the common video frame 504, while the variable scene content is captured by the dynamic video frames 506.

Figure 6:
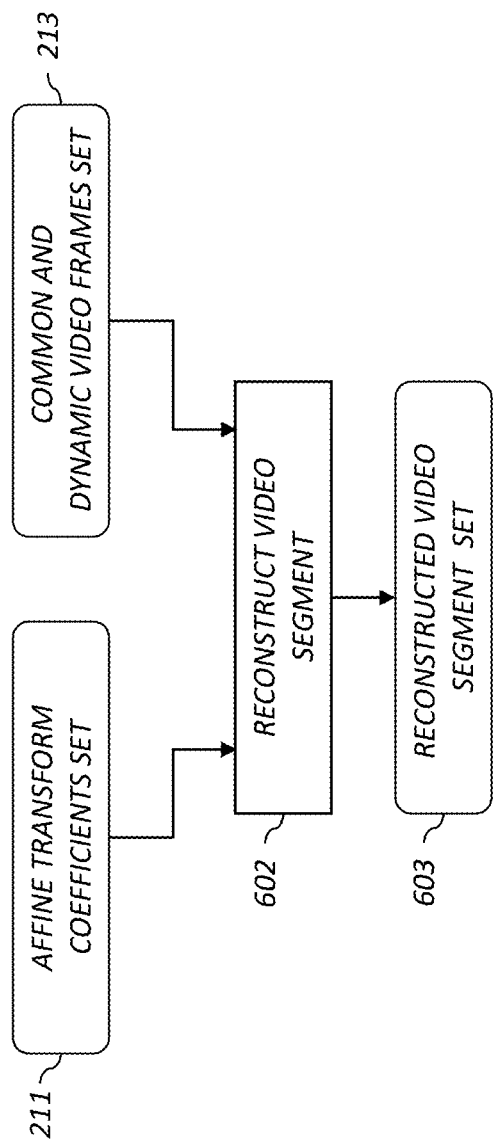
FIG. 6 is a flow diagram illustrating a method for reconstructing a video segment from its common and dynamic scene content according to an embodiment of the present invention.

The common and dynamic video frames set 213, in conjunction with the affine transform coefficients set 211, contain sufficient information to reconstruct the selected video segment 209. FIG. 6 illustrates the formation of a reconstructed video segment set 603 according to a preferred embodiment. A reconstruct video segment step 602 uses the common and dynamic video frames set 213 and the affine transform coefficients set 211 to form the reconstructed video segment set 603, which represents an estimate of the selected video segment 209. The reconstructed video segment set 603 can be determined in any appropriate way known to those skilled in the art. In a preferred embodiment, the reconstruct video segment step 602 uses Eq. (9) to reconstruct the selected video segment 209:

$$\hat{f}_i = T(\Theta_i)C + D_i \qquad (9)$$

where $\hat{f}_i$ is the reconstructed estimate of the $i^{th}$ video frame, $f_i$, of the selected video segment 209. The reconstructed video frames $\hat{f}_i$ (1≤i≤n) are collected in the reconstructed video segment set 603. Due to the noise robustness property of sparse solvers, the reconstructed video segment set 603 is robust to noise. In other words, denoising is automatically achieved during the video reconstruction process.

Figure 7:
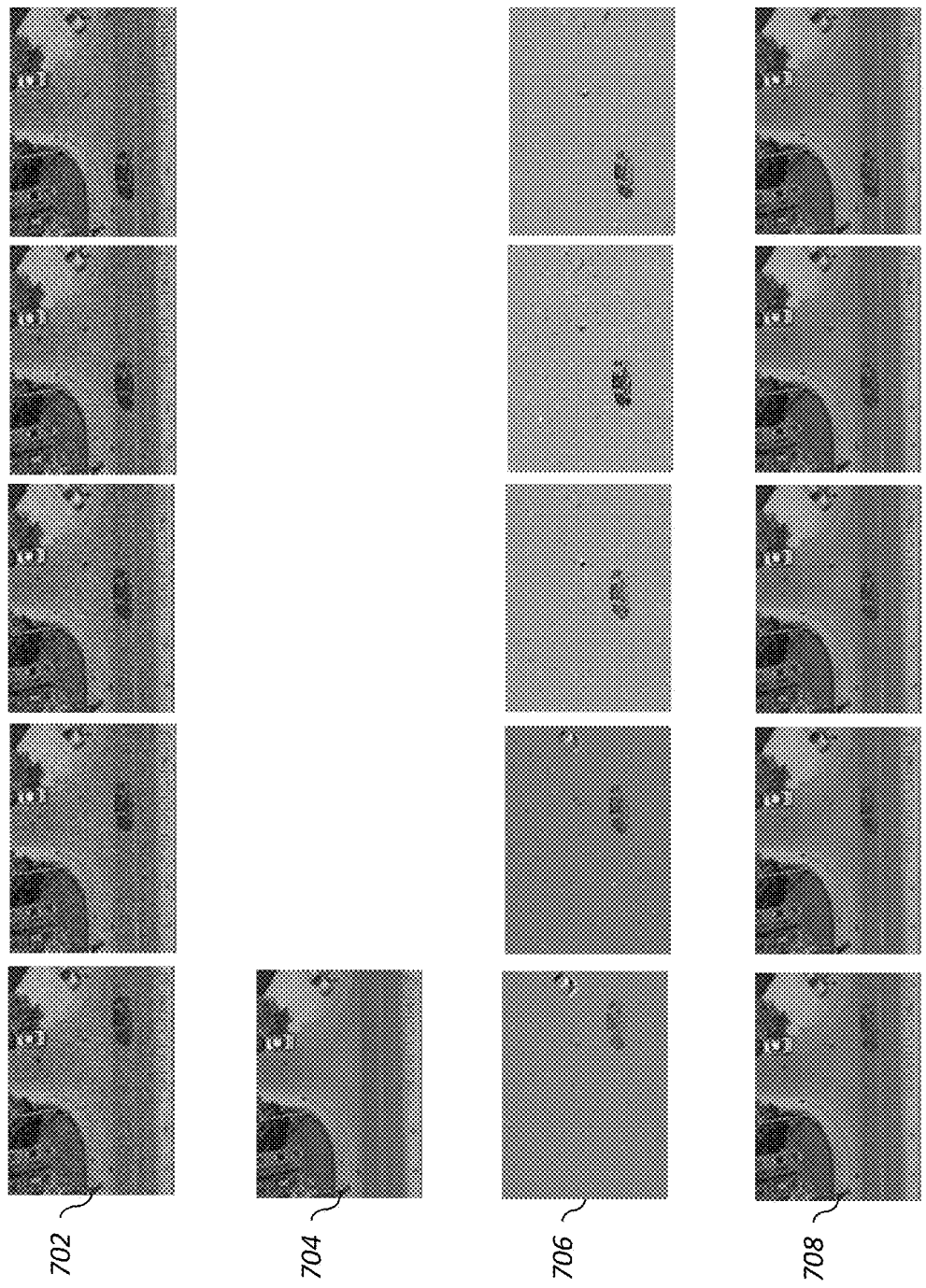
FIG. 7 shows example denoising results obtained according to an embodiment of the present invention.

FIG. 7 shows an example of a noisy video segment 702. A common scene image 704 and dynamic scene images 706 corresponding to the noisy video segment 702 were determined according to the method of FIG. 2. A reconstructed denoised video 708 is also shown, which was determined according to the method shown in FIG. 6. This example clearly illustrates the denoising property of the algorithm described here.

Figure 8:
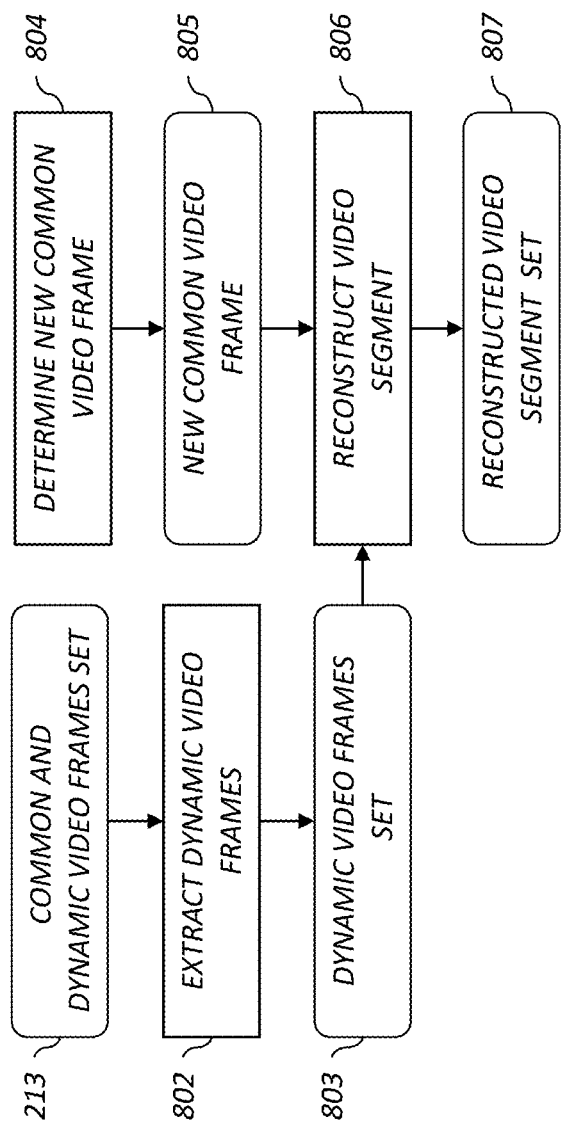
FIG. 8 is a flow diagram illustrating a method for changing the common scene content of a video segment according to an embodiment of the present invention.

In addition to reconstruction and denoising, the proposed algorithm can be used for many useful video editing and tracking applications without performing motion estimation and compensation. A preferred embodiment of a method for modifying the common scene content of the selected video segment 209 is shown in FIG. 8. An extract dynamic video frames step 802 extracts the dynamic video frames ($D_1$, $D_2$, ..., $D_n$) from the common and dynamic video frames set 213 to provide a dynamic video frames set 409. A determine new common video frame step 804 provides a new common video frame 805 that is used to modify the common scene content of the selected video segment 209. In a preferred embodiment, a user interface is provided enabling a user to manually select the new common video frame 805 according to user preference. A reconstruct video segment step 806 uses the dynamic video frames set 803 and the new common video frame 805 to produce the reconstructed video segment set 807. The video frames of the reconstructed video segment set 807 inherit the dynamic scene contents from the selected video segment 209, but have different common scene content as explained next.

The reconstructed video segment set 807 can be determined in any appropriate way known to those skilled in the art. In a preferred embodiment, the reconstruct video segment step 806 uses Eq. (10) to produce the reconstructed video segment set 807:

$$f_i^R = \nu C^N + \rho D_i \qquad (10)$$

where $f_i^R$ is the reconstructed version of the $i^{th}$ video frame, $f_i$, of the selected video segment 209, $C^N$ is the value of the new common video frame 805, and ν and ρ are constants. In a preferred embodiment, ν and ρ are pre-determined constants that control the visual quality of $f_i^R$. The reconstructed video frames $f_i^R$ (1≤i≤n) are collected in the reconstructed video segment set 807.

Similar to the application described in FIG. 8 where the common scene content of the selected video segment 209 is replaced with new common scene content, in some embodiments, the dynamic scene content in the dynamic video frames can be replaced with new dynamic scene content and combined with the original common scene content to provide a new reconstructed video segment set 807.

Figure 9:
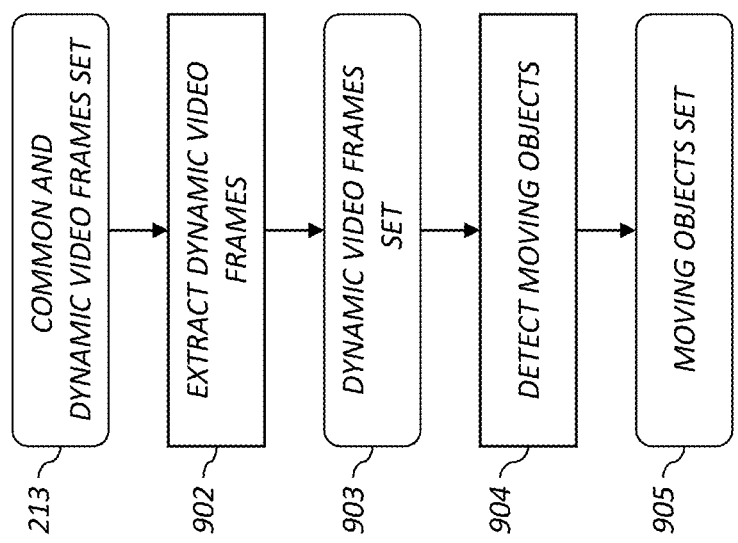
FIG. 9 is a flow diagram illustrating a method for tracking moving objects according to an embodiment of the present invention.

FIG. 9 illustrates a method for detecting moving objects in the selected video segment 209 in accordance with the present invention. An extract dynamic video frames step 902 extracts the dynamic video frames ($D_1$, $D_2$, ..., $D_n$) from the common and dynamic video frames set 213 to provide a dynamic video frames set 903. A detect moving objects step 904 determined the co-ordinates of the moving objects present in the selected video segment 209 responsive to the dynamic video frames set 903. The co-ordinates of the moving objects produced by the detect moving objects step 904 are stored in a moving objects set 905. The moving objects set 905 can be determined in any appropriate way known to those skilled in the art. In a preferred embodiment, the detect moving objects thresholds the pixel values of the dynamic video frames $D_1$, $D_2$, ..., $D_n$ as shown in Eq. (11):

$$D_i(r,s) = \begin{cases} 1 & \text{if } |D_i(r,s)| > T \\ 0 & \text{otherwise,} \end{cases} \qquad (11)$$

$$1 \le i \le n$$

where T is a threshold. The threshold T can be determined in any appropriate way known to those skilled in the art. In some embodiments, the threshold T is a predetermined constant. However, it has been found that in many cases it is preferable for the threshold T to be video dependent. A user interface can be provided enabling the user to specify a heuristically determined threshold T that works best for a particular selected video segment 209. The co-ordinates corresponding to $|D_i(r,s)|=1$ are collected in the moving objects set 905.

The method described earlier with respect to FIGS. 3 and 4 for estimating the common and dynamic video frames assumes that the selected video segment 209 contains only one scene including common scene content. However, in practice, an input digital video 203 may contain multiple scenes; therefore, it is desirable to detect scene boundaries automatically. After determining scene boundaries, a set of common and dynamic video frames can be estimated for the individual video segments corresponding to each scene in accordance with the method of the present invention described above. A scene boundary detection method that exploits the algorithm presented above to automatically detect the scene boundaries in a video is presented next.

Figure 10:
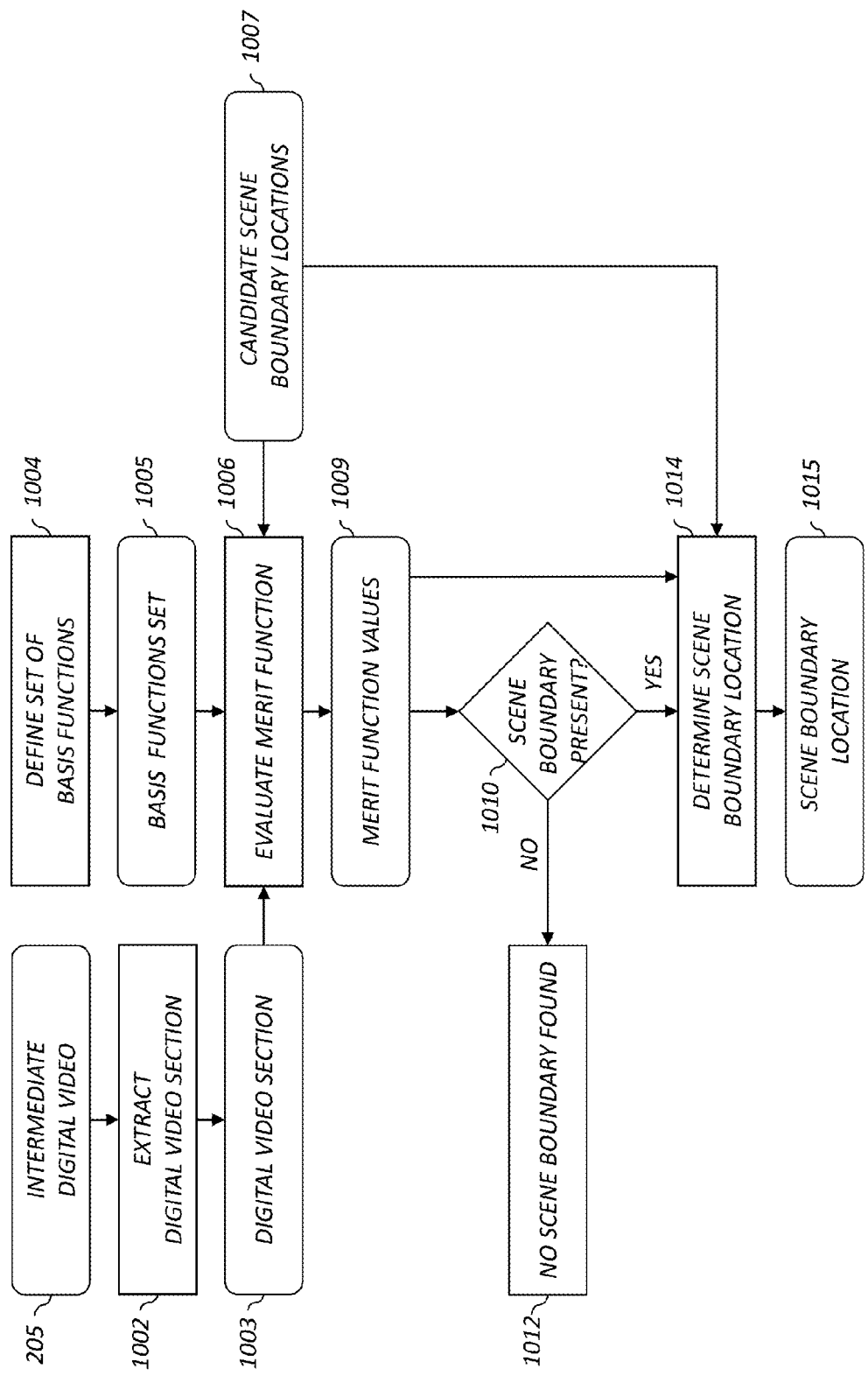
FIG. 10 is a flow diagram illustrating a method for determining a scene boundary between a first scene and a second scene in an input video sequence according to an embodiment of the present invention.

FIG. 10 is a flow diagram illustrating a method for determining a scene boundary between a first scene and a second scene in the intermediate digital video 205 including a time sequence of input video frames, according to an embodiment of the present invention. In a preferred embodiment, the intermediate digital video 205 is divided into a plurality of digital video sections 1003 and each of the digital video sections 1003 is analyzed to determine whether it contains a scene boundary. The time duration of the digital video sections 1003 is chosen to be small enough that it is unlikely that they would contain more than one scene boundary (e.g, 10 video frames). An extract digital video section step 1002 extracts a particular digital video section 1003 from the intermediate digital video 205 for analysis. In a preferred embodiment, the set of digital video sections 1003 are defined such that consecutive digital video sections 1003 overlap slightly in order to avoid missing scene boundaries that happen to occur at the end of a digital video section 1003.

Figure 11:
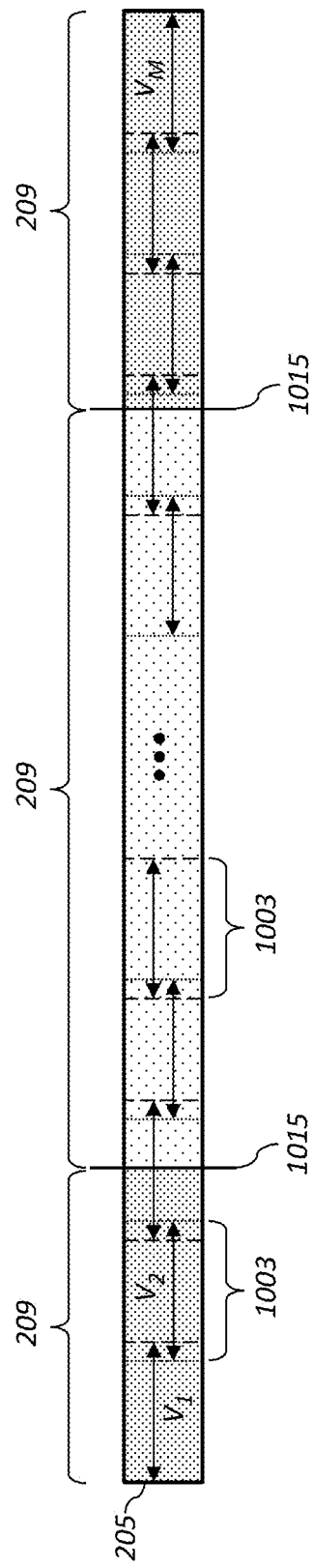
FIG. 11 is a diagram showing the extraction of overlapping digital video sections from a digital video according to an embodiment of the present invention.

FIG. 11 shows a diagram illustrating an intermediate digital video 205 that includes three video segments 209 corresponding to different scenes, which are divided by scene boundaries at scene boundary locations 1015. The intermediate digital video 205 is divided into a set of M overlapping digital video sections 1003 ($V_1$-$V_M$). In accordance with the present invention, the method of FIG. 10 is applied to each of the digital video sections 1003 to determine whether they contain a scene boundary, and if so to determine the scene boundary location 1015.

Returning to a discussion of FIG. 10, a define set of basis functions step 1004 defines a set of basis functions for representing the dynamic scene content of the digital video section 1003. The set of basis functions is collected in a basis functions set 1005. In a preferred embodiment, the basis functions set 1005 is the same set of DCT basis functions that were discussed earlier with respect to FIG. 4.

An evaluate merit function step 1006 evaluates a merit function for a set of candidate scene boundary locations 1007. The evaluate merit function step 1006 analyzes the digital video section 1003 responsive to the basis functions set 1005 for each of the candidate scene boundary locations 1007 to determine corresponding merit function values 1009. The merit function values 1009 provide an indication of the likelihood that a particular candidate scene boundary location 1007 corresponds to a scene boundary. A preferred form for the merit function will be described relative to FIG. 13, but any appropriate merit function can be used in accordance with the present invention.

A scene boundary present test 1010 evaluates the determined merit function values 1009 to determine whether a scene boundary is present in the digital video section 1003. Let $S=\{\pi_1, \pi_2, \ldots, \pi_\omega\}$ be the candidate scene boundary location 1007, wherein each $\pi_i \in [1, \ldots, N]$, $1 \leq i \leq \omega$. The corresponding set of merit function values 1009 can be represented as $\Pi=\{MF_{\pi_1}, MF_{\pi_2}, \ldots, MF_{\pi_\omega}\}$. In a preferred embodiment of the present invention, the scene boundary present test 1010 determines the maximum merit function value $\Pi_{max}=\max(\Pi)$ and the minimum merit function value $\Pi_{min}=\min(\Pi)$ in the set of merit function values 1009. The scene boundary present test 1010 determines that a scene boundary is present if a ratio between $\Pi_{max}$ and $\Pi_{min}$ is less than a predefined threshold. That is, the digital video section 1003 is designated to have a scene boundary if $\Pi_{max}/\Pi_{min} \geq T_s$, where $T_s$ is a predefined threshold.

Figure 12B:
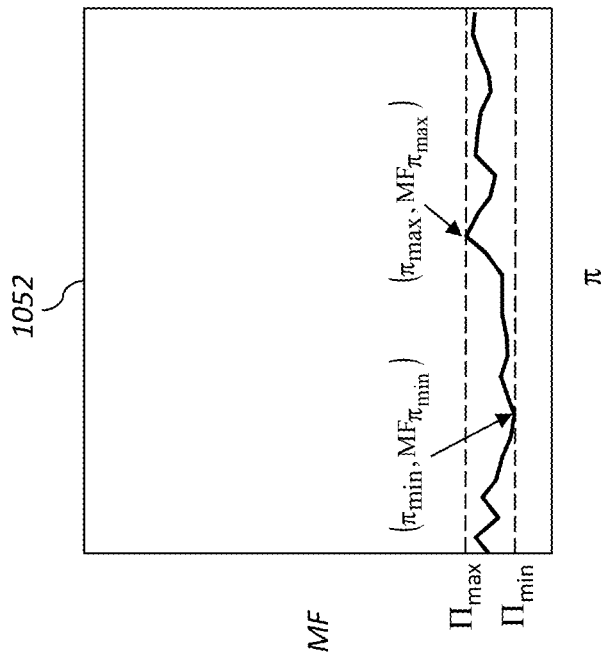
FIG. 12B is a graph plotting a merit function value as a function of candidate scene boundary location for a digital video section that does not include a scene boundary.
Figure 12A:
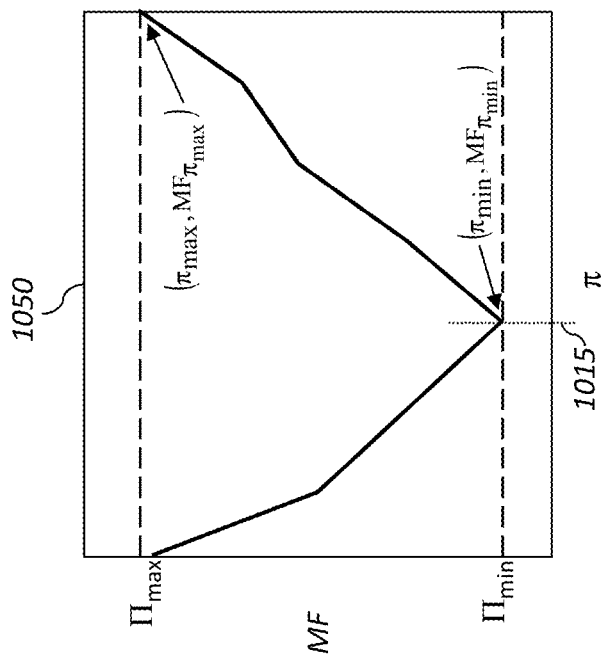
FIG. 12A is a graph plotting a merit function value as a function of candidate scene boundary location for a digital video section including a scene boundary.

FIG. 12A shows a graph 1050 plotting the merit function value 1009 (MF) as a function of the candidate scene boundary location 1007 ($\pi$) for a digital video section 1003 that includes a scene boundary. Likewise, FIG. 12B shows a graph 1052 plotting the merit function value 1009 (MF) as a function of the candidate scene boundary location 1007 ($\pi$) for a digital video section 1003 that does not include a scene boundary. It can be seen that the range between $\Pi_{max}$ and $\Pi_{min}$ is much smaller in FIG. 12B than it was for FIG. 12A.

If the scene boundary present test 1010 determines that no scene boundary is present (i.e., $\Pi_{max}/\Pi_{min} < T_s$), then a no scene boundary found step 1012 is used to indicate that the digital video section 1003 does not include a scene boundary.

If the scene boundary present test 1010 determines that a scene boundary is present, then a determine scene boundary location step 1014 determines a scene boundary location 1015 which divides the digital video section 1003 into first and second scenes responsive to the merit function values 1009.

In a preferred embodiment, the scene boundary location 1015 is defined to be the candidate scene boundary location 1007 corresponding to the minimum merit function value in the set of merit function values 1009. The determine scene boundary location step 1014 selects $\pi_{min}$, which is the element of S that corresponds to the minimum merit function value $\Pi_{min}=\text{Min}(\Pi)=MF_{\pi_{min}}$, to be the scene boundary location 1015. This is illustrated in FIG. 12A, which shows the designated scene boundary location 1015 that corresponds to the position of the minimum merit function value $\Pi_{min}$ that occurs at $\pi_{min}$.

The discussion above describes the case where the candidate scene boundary locations 1007 includes each of the video frames in the digital video section 1003. This corresponds to performing an exhaustive search of all of the possible candidate scene boundary locations. One skilled in the art will recognize that other embodiments can use other search techniques to identify the candidate scene boundary location 1007 producing the minimum merit function value $\Pi_{min}$. For example, an iterative search technique, such as the well-known golden section search technique, can be used to converge on the desired solution for the scene boundary location 1015. Such iterative search techniques have the advantage that they require fewer computations as compared to the exhaustive search technique.

The method discussed relative to FIG. 10 is repeated for each of the digital video sections 1003 that were defined from the intermediate digital video 205. The get video segments step 206 of FIG. 2 then uses the resulting set of scene boundary locations 1015 to segment the intermediate digital video 205 into the video segments set 207.

Figure 13:
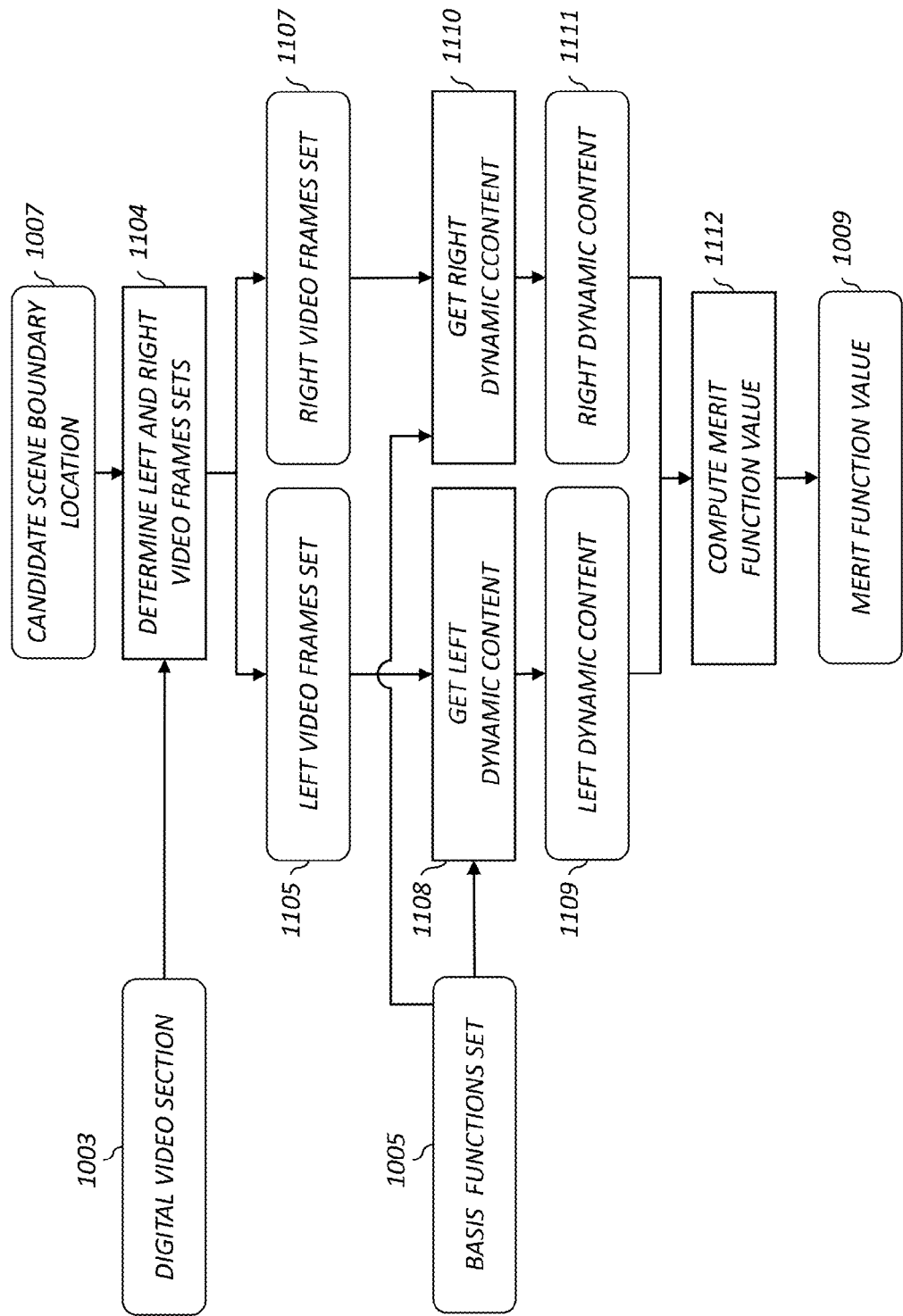
FIG. 13 is a flow diagram illustrating a method for computing the merit function values of FIG. 10 according to an embodiment of the present invention.

The evaluate merit function step 1006 evaluates a predefined merit function for each of the candidate scene boundary locations 1007 to determine corresponding merit function values 1009. FIG. 13 is a flow chart illustrating the computation of a merit function value 1009 for a particular candidate scene boundary location 1007 according to a preferred embodiment of the present invention.

The set of candidate scene boundary locations 1007 that are evaluated can be determined using any method known to those skilled in the art. In a preferred embodiment of the present invention, each of the video frames in the digital video section 1003 are evaluated as a candidate scene boundary location 1007. Let $\zeta_1, \zeta_2, \ldots, \zeta_N$ be the video frames stored in the digital video section 1003. Let $\pi$ be the value of the candidate scene boundary location 1007, then $\pi \in \{1, 2, \ldots, N\}$ where N is the total number of video frames in the digital video section 1003.

A determine left and right video frames sets step 1104 partitions the digital video section 1003 into a left video frames set 1105 and a right video frames set 1107 by dividing the digital video section 1003 at the candidate scene boundary location 1007 (π). Accordingly, the left video frames set 1105 contains the video frames of the digital video section 1003 preceding the candidate scene boundary location 1007 (i.e., $\zeta_1, \zeta_2, \ldots, \zeta_{\pi-1}$). Similarly, the right video frames set 1107 contains the video frames following the candidate scene boundary location 1007 (i.e., $\zeta_\pi, \zeta_{\pi+1}, \ldots, \zeta_N$).

A get left dynamic content step 1108 uses the basis functions set 1005 to determine left dynamic content 1109 providing an indication of the dynamic scene content in the left video frames set 1105. In a preferred embodiment, the dynamic scene content for each of the video frames $\zeta_1, \zeta_2, \ldots, \zeta_{\pi-1}$ in the left video frames set 1105 is represented using a sparse combination of the basis functions in the basis functions set 1005, wherein the sparse combination of the basis functions is determined by finding a sparse vector of weighting coefficients for each of the basis function in the basis functions set 1005. The sparse vector of weighting coefficients for each video frame in the left video frames set 1105 can be determined using any method known to those skilled in the art. In a preferred embodiment, the same method that was discussed relative to FIG. 2 is used to estimate the common and the dynamic scene contents for the video frames $\zeta_1, \zeta_2, \ldots \zeta_{\pi-1}$ in the left video frames set 1105. Accordingly, the basis functions of the basis functions set 1005 are used in Eq. (8) to estimate the common scene content ($C^L$) and the dynamic scene content ($D_1^L, \ldots, D_{\pi-1}^L$) for the video frames $\zeta_1, \zeta_2, \ldots, \zeta_{\pi-1}$, where $D_\tau^L = \lambda \alpha_\tau^L$; $1 \leq \tau \leq \pi-1$, $\lambda$ is the matrix representation of the basis functions in the basis functions set 1005 and $\alpha_\tau^L$ is a sparse vector of weighting coefficients corresponding to the $\tau^{th}$ dynamic content. The resulting sparse vector of weighting coefficients ($\alpha_1^L, \alpha_2^L, \alpha_{\pi-1}^L$) is stored as the left dynamic content 1109.

Similarly, a get right dynamic content step 1110 uses the basis functions set 1005 to determine right dynamic content 1111 providing an indication of the dynamic scene content in the right video frames set 1107. In a preferred embodiment, the dynamic scene content for each of the video frames $\zeta_\pi, \zeta_{\pi+1}, \ldots, \zeta_N$ in the right video frames set 1107 is represented using a sparse combination of the basis functions in the basis functions set 1005, wherein the sparse combination of the basis functions is determined by finding a sparse vector of weighting coefficients for each of the basis function in the basis functions set 1005. The sparse vector of weighting coefficients for each video frame in the right video frames set 1107 can be determined using any method known to those skilled in the art. In a preferred embodiment, the method that was discussed relative to FIG. 2 is used to estimate the common and the dynamic scene contents for the video frames $\zeta_\pi, \zeta_{\pi+1}, \ldots, \zeta_N$ in the right video frames set 1107. Accordingly, the basis functions of the basis functions set 1005 are used in Eq. (8) to estimate the common scene content ($C^R$) and the dynamic scene content ($D_\pi^L, \ldots, D_N^L$) for the frames $\zeta_\pi, \zeta_{\pi+1}, \ldots, \zeta_N$, where $D_\tau^R = \lambda \alpha_\tau^R$; $\pi \leq \tau \leq N$, $\lambda$ is the matrix representation of the basis functions in the basis functions set 1005 and $\alpha_\tau^R$ is a sparse vector of weighting coefficients corresponding to the $\tau^{th}$ dynamic content. The resulting sparse vector of weighting coefficients ($\alpha_\pi^R, \alpha_{\pi+1}^R, \alpha_N^R$) is stored as the right dynamic content 1111.

A compute merit function value step 1112 determines the merit function value 1009 by combining the left dynamic content 1109 and the right dynamic content 1111. The compute merit function value step 1112 can use any method known to those skilled in the art to determine the merit function value 1009. In a preferred embodiment, the weighting coefficients in the left dynamic content 1109 and the right dynamic content 1111 are concatenated to form a combined vector of weighting coefficients. The compute merit function value step 1112 the computes an l-1 norm of the combined vector of weighting coefficients to determine the merit function value 1009 as given by Eq. (12):

$$MF_\pi = \|[\alpha_1^L, \ldots, \alpha_{\pi-1}^L, \alpha_\pi^R, \ldots, \alpha_N^R]^T\|_1 \qquad (12)$$

where $MF_\pi$ is the merit function value 1009 for the candidate scene boundary location 1007 (π), and $\|\cdot\|_1$ denotes l-1 norm.

In a preferred embodiment, the get video segments step 206 of FIG. 2 uses the set of scene boundary locations 1015 determined using the method of FIG. 10 to segment the intermediate digital video 205 into the video segments set 207. Each video segment corresponds to the sequence of video frames extending from one scene boundary location 1015 to the next.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST 110 data processing system
120 peripheral system
130 user interface system
140 data storage system
202 receive input digital video step
203 input digital video
204 initialize intermediate digital video step
205 intermediate digital video
206 get video segments step
207 video segments set
208 select video segment step
209 video segment
210 get affine transform coefficients step
211 affine transform coefficients set
212 get common and dynamic video frames step
213 common and dynamic video frames set
302 determine transform coefficients model step
303 transform coefficients model set
304 determine measurement vector step
305 measurement vector set
306 estimate affine transform coefficients step
402 define first set of basis functions step
403 first set of basis functions
404 determine common video frame step
405 common video frame
406 define second set of basis functions step
407 second set of basis functions
408 determine dynamic video frames step
409 dynamic video frames set
410 determine common and dynamic video frames step
502 video segment
504 common video frame
506 dynamic video frames
602 reconstruct video segment step
603 reconstructed video segment set
702 noisy video segment
704 common scene image
706 dynamic scene images
708 reconstructed video segment
802 extract dynamic video frames step
803 dynamic video frames set
804 determine new common video frame step
805 new common video frame 806 reconstruct video segment step
807 reconstructed video segment set
902 extract dynamic video frames step
903 dynamic video frames set
904 detect moving objects step
905 moving objects set
1002 extract digital video section step
1003 digital video section
1004 define set of basis functions step
1005 basis functions set
1006 evaluate merit function step
1007 candidate scene boundary locations
1009 merit function values
1010 scene boundary present test
1012 no scene boundary found step
1014 determine scene boundary location step
1015 scene boundary location
1104 determine left and right video frames sets step
1105 left video frames set
1107 right video frames set
1108 get left dynamic content step
1109 left dynamic content
1110 get right dynamic content step
1111 right dynamic content
1112 compute merit function value step

The invention claimed is:

1. A method comprising:
determining an affine transform having a set of affine transform coefficients for each input video frame that can be used to align common scene content in input video frames;
defining a first set of basis functions for representing the common scene content;
defining a second set of basis functions for representing dynamic scene content;
automatically determining a common video frame including the common scene content by forming a sparse combination of the first basis functions;
automatically determining a dynamic video frame for each input video frame by forming a sparse combination of the second basis functions, wherein the dynamic video frames can be combined with the respective affine transforms and the common video frame to provide reconstructed video frames providing representations of the respective input video frames; and
storing representations of the common video frame and the dynamic video frames in a processor-accessible memory; wherein the method is performed at least in part using a data processing system.

2. The method of claim 1 wherein the common video frame C is determined using the equation:

$$C = \psi\beta$$

and the $i^{th}$ dynamic video frame $D_i$ is determined using the equation:

$$D_i = \Phi\alpha_i$$

where $\psi$ is the first set of basis functions, $\phi$ is the second set of basis functions, $\beta$ is a sparse set of weighting coefficients for representing the common video frame, $\alpha_i$ is a sparse set of weighting coefficients for representing the $i^{th}$ dynamic video frames, and wherein $\beta$ and $\alpha_i$ are determined by solving the equation:

$$f_i = T(\Theta_i)\psi\beta + \phi\alpha_i$$

where $f_i$ is the $i^{th}$ input video frames, $T(\Theta_i)$ is an affine transform based on the affine transform coefficients $\Theta_i$ for the $i^{th}$ frame.

3. The method of claim 1 wherein at least one of the sets of basis functions is a set of DCT basis functions, a set of wavelet basis functions or a set of delta function basis functions.

4. The method of claim 1 wherein the first set of basis functions is the same as the second set of basis functions.

5. The method of claim 1 wherein the affine transform coefficients are represented using an auto regressive model.

6. The method of claim 1 wherein the affine transform coefficients are determined using a sparse representation framework.

7. The method of claim 1 further including determining a reconstructed video sequence including a time sequence of reconstructed video frames, wherein each reconstructed video frame is determined by combining the common video frame with the respective dynamic video frames and respective affine transforms.

8. The method of claim 7 wherein the reconstructed video sequence has a lower noise level than the input video sequence.

9. The method of claim 1 further including determining a modified video sequence including a time sequence of modified video frames, wherein each modified video frame is determined by combining the respective dynamic video frames with a new common video frame.

10. The method of claim 9 wherein the modified video frames are determined by computing a weighted combination of the respective dynamic video frame and the new common video frame.

11. The method of claim 1 further including determining a modified video sequence including a time sequence of modified video frames, wherein each modified video frame is determined by combining a corresponding new dynamic video frame from a set of new dynamic video frames with the common video frame.

12. The method of claim 1 further including detecting moving objects in the video sequence by analyzing the dynamic video frames.

13. The method of claim 12 wherein the dynamic video frames are analyzed by applying a threshold operation to detect pixels corresponding to moving objects.

14. A system comprising:
a data processing system, wherein the data processing system includes a data processing device configured to:
determine an affine transform having a set of affine transform coefficients for each input video frame that can be used to align common scene content in input video frames;
define a first set of basis functions for representing the common scene content;
define a second set of basis functions for representing dynamic scene content;
determine a common video frame including the common scene content by forming a sparse combination of the first basis functions; and
determining a dynamic video frame for each input video frame by forming a sparse combination of the second basis functions, wherein the dynamic video frames can be combined with the respective affine transforms and the common video frame to provide reconstructed video frames providing representations of the respective input video frames;
a peripheral system communicatively connected to the data processing system;

a user interface system communicatively connected to the data processing system; and a data storage system communicatively connected to the data processing system, wherein the data storage system is configured to store representations of the common video frame and the dynamic video frames in a processor-accessible memory; wherein the method is performed at least in part using a data processing system.

15. The system of claim 14 wherein the affine transform coefficients are represented using an auto regressive model.

16. The system of claim 14 wherein the affine transform coefficients are determined using a sparse representation framework.

17. The system of claim 14 wherein the processing device is further configured to determine a reconstructed video sequence including a time sequence of reconstructed video frames, wherein each reconstructed video frame is determined by combining the common video frame with the respective dynamic video frames and respective affine transforms.

18. The system of claim 17 wherein the reconstructed video sequence has a lower noise level than the input video sequence.

19. The system of claim 14 wherein the processing device is further configured to determine a modified video sequence including a time sequence of modified video frames, wherein each modified video frame is determined by combining the respective dynamic video frames with a new common video frame.

20. The system of claim 19 wherein the modified video frames are determined by computing a weighted combination of the respective dynamic video frame and the new common video frame.

* * * * *